J. CAYGILL.
FURNACE.
APPLICATION FILED JUNE 17, 1908.
931,565.
Patented Aug. 17, 1909.
2 SHEETS—SHEET 1.
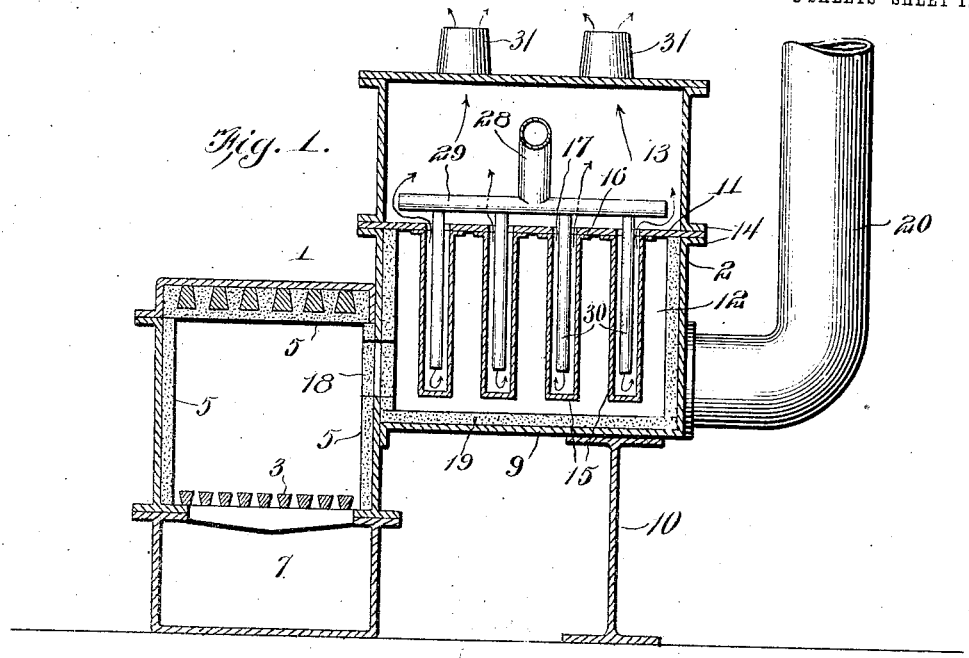
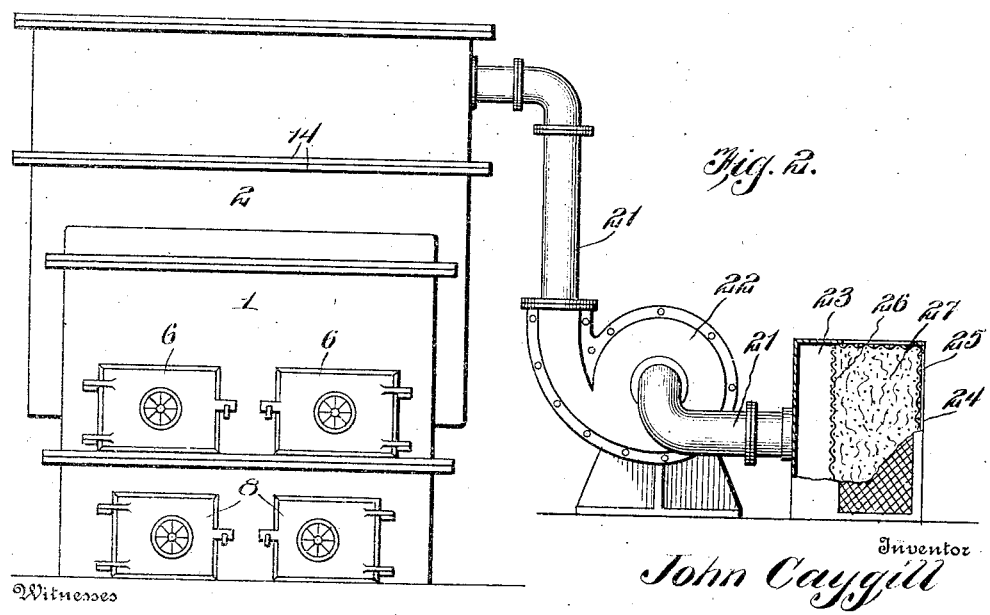
Witnesses
Inventor
John Caygill
By Victor J. Evans
Attorney

J. CAYGILL.
FURNACE.
APPLICATION FILED JUNE 17, 1908.

931,565.

Patented Aug. 17, 1909.
2 SHEETS—SHEET 2.

Witnesses
Louis R. Heinrichs
D. W. Gould

Inventor
John Caygill
By Victor J. Evans
Attorney

UNITED STATES PATENT OFFICE.

JOHN CAYGILL, OF RIDGWAY, PENNSYLVANIA.

FURNACE.

No. 931,565.  Specification of Letters Patent.  Patented Aug. 17, 1909.

Application filed June 17, 1908. Serial No. 438,959.

*To all whom it may concern:*

Be it known that I, JOHN CAYGILL, a citizen of the United States, residing at Ridgway, in the county of Elk and State of Pennsylvania, have invented new and useful Improvements in Furnaces, of which the following is a specification.

The invention relates to an improvement in furnaces, being directed particularly to a furnace adapted to supply fresh air in a heated condition to any desired point or points.

The main object of the present invention is the provision of a heating furnace in which the fresh air is subjected to the full effect of the heated products of combustion and collected for distribution after such heating.

The invention will be described in the following specification, reference being had particularly to the accompanying drawings, in which:—

Figure 3:
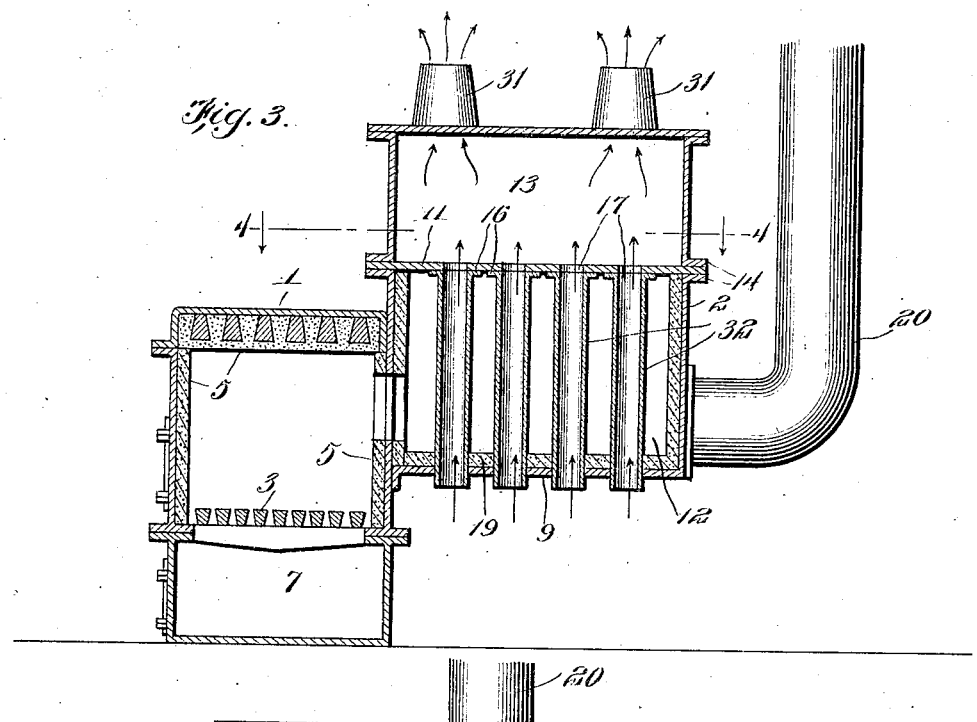
Figure 4:
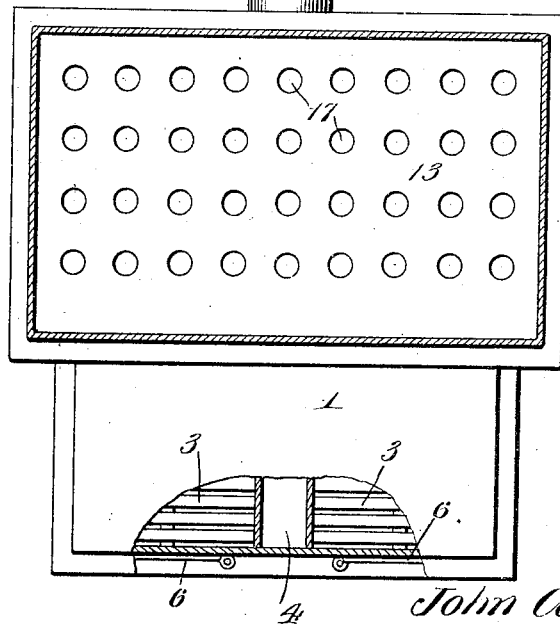

Figure 1 is a vertical section, partly in elevation, of a furnace constructed in accordance with my invention. Fig. 2 is a front elevation of the same, partly in section. Fig. 3 is a vertical section partly in elevation of a slightly modified form of furnace, and Fig. 4 is a section on line 4—4 of Fig. 3.

Referring particularly to Figs. 1 and 2 of the drawings, wherein is shown the preferred form of details of structure, my improved furnace is constructed to provide a fire casing 1 and an air casing 2, the latter of which is arranged in rear and above the former.

The fire casing 1, which is constructed in any desired manner, as for example of usual sheet metal to form an approximately rectangular casing within which at an appropriate height is arranged a grate or series of grates 3, the interior of the casing above the grate forming the fire pot 4 and being suitably lined with refractory material 5 and provided with the usual doors 6 for charging purposes. The interior of the casing below the grate is adapted to provide the usual ash pit 7; the forward wall of which is provided with the usual doors 8. The air casing 2 is arranged in rear of the fire casing, the rear wall of said latter casing being adapted to form the forward wall of the air casing. The air casing, which is of materially greater dimensions than that of the fire casing, is arranged with its bottom wall 9 on a plane above that of the grate in the fire casing, an auxiliary support 10 being arranged to maintain that portion of the air casing remote from the fire casing at the desired elevation. The air casing is divided by a transverse head plate 11 into two chambers, the lower one 12 being hereinafter termed the air heating chamber and the upper one 13 being hereinafter termed the fresh air chamber. Preferably the walls of the air casing are formed in two sections, the adjacent edges of which are provided with laterally projected flanges 14, between which the head plate 11 is secured.

Secured to the head plate and depending within the air heating chamber 12 are air cells 15, which are in effect cylindrical bodies closed at their lower ends and open at their upper ends, the edges of the bodies adjacent their upper ends being formed with laterally projected flanges 16, whereby to secure the cells to the underside of the head plate. The head plate is formed at appropriate intervals with openings 17, and the particular cells are secured to the head plate in alinement with said openings, it being understood in this connection that the openings 17 and corresponding air cells may be in any desired number commensurate with the size of the head plate and controlled solely by the quantity of air which it is desired to heat in a given time. The forward wall of the air casing, which, as before stated, is in common with the fire casing, is formed with an opening 18 through which the products of combustion and heat generated in the fire casing pass to the air heating chamber 12, it being understood that the latter chamber is preferably lined with refractory material, as shown at 19. An escape flue 20 is connected to the rear wall of the air casing approximately in horizontal alinement with the opening 18, said escape flue being in communication with the interior of the air heating chamber so that the products of combustion are directed transverse the chamber in the use of the furnace. By this utilization of the products of combustion the air cells 15, which are of a material having a heat conductivity, become highly heated, as will be obvious.

An air supply pipe 21 is arranged to supply the air casing with fresh air. At an appropriate point in the length of the air supply pipe is arranged a blower or fan 22, by which the air is drawn in at one end of the pipe and forced lengthwise into the air casing. At the inlet end of the pipe 21, which is preferably disposed at a point readily accessible to fresh air, I arrange a filter box 23, preferably a rectangular structure having its forward wall and the forward portions of its top and side walls formed with openings 24 covered or otherwise protected by screen material 25. The relatively rear portions of the sides and top walls are solid and within the filter at a point approximately in alinement with the forward edges of the solid portions of the walls there is arranged a transverse screen partition 26. That portion of the filter box in advance of the screen partition is filled with a filtering medium 27, as cotton, wool, or other material which will separate from the air any foreign particles finding their way through the screen guards 25. The air delivered to the air casing is thus filtered and delivered in a condition as free from dust and foreign particles as possible. The air supply pipe is led within the fresh air chamber 13 and depends within said chamber, as at 28, the depending portion being in open communication with pipes 29, from which depend feed sections 30, each of said feed sections being disposed within one of the air cells 15, the lower open end of the feed section terminating slightly above the closed lower end of the air cell. The top of the air casing is provided with outlet pipe sections 31, which may be arranged in any suitable number and which are adapted to receive the pipe sections to lead the heated air to any desired point or points in use.

In operation, in the form of furnace shown in Figs. 1 and 2, the fresh air filtered in the filter box 23 is by means of the fan 22 forced into the lower ends of the respective air cells 15, and as these cells are highly heated by the products of combustion from the fire casing, it is obvious that the air delivered from the feed sections 30 will also become highly heated. The air thus heated finds its way through the air cells in the space surrounding the feed sections 30 and is delivered directly into the fresh air chamber 13 and from thence through the outlets 31.

In the form shown in Figs. 3 and 4 the construction is identical with that previously described in so far as the fire casing 1 and air casing 2 are concerned, and the details of construction hereinbefore referred to, together with the numerals indicating such details, are used in connection with Figs. 3 and 4. In this instance, however, the air supply pipe 21, the air cells 15, and the feed sections 30 are dispensed with, and in lieu thereof the head plate 11 of the air casing is provided with a series of depending pipe conduits 32, which communicate at their upper ends with the openings 17 in the head plate and extend at their lower ends through the bottom wall of the air casing, the lower ends of the pipe conduits 32 being freely open to the atmosphere. As in the preferred form the pipe conduits 32 are highly heated by the products of combustion and the heated condition of said pipes induces an air circulation toward the outlets 31, by which circulation fresh air is drawn into the lower open ends of the conduits. It is, of course, to be understood that in this form the pipe conduits 32 may, if desired, communicate with the atmosphere at any point remote from the furnace by suitable extension of the conduits.

In either construction described it is obvious that a constant supply of highly heated air of a fresh or oxygenated character may be delivered from the furnace in the usual operation of the latter. In this connection it is to be noted that the furnace will, particularly in the form shown in Figs. 1 and 2, be adapted for supplying fresh air of a comparatively cool character by dispensing with the heat in the fire casing and delivering air under the pressure of the blower directly to the point of use in the manner described in connection with the heated air.

Aside from the particulars noted the details of construction of my improved furnace are immaterial, the material of which the parts are constructed, or the particular size of the various parts being controlled primarily by the use for which the particular furnace is intended and forming no material parts of the present invention.

Having thus described the invention what is claimed as new, is:—

1. A furnace including a fire casing, an air casing in communication therewith, a head plate dividing said air casing into an upper and a lower chamber, air cells depending from said head plate within the lower chamber, said cells being closed at their lower ends and in communication with the upper chamber, and means for delivering air in a single stream to said upper chamber, and means for dividing the body of air in a plurality of streams within said upper chamber and delivering each particular stream of air to one of said air cells at a point adjacent their closed ends.

2. A furnace including a fire casing, an air casing in communication therewith, a head plate dividing said air casing into an upper and a lower chamber, air cells depending from said head plate within the lower chamber, said cells being closed at their lower ends and in communication with the upper chamber, and an air supply pipe for delivering air as a single stream to the upper chamber and dividing it in said upper chamber into a plurality of streams for delivery to the respective cells near their closed ends.

3. A furnace including a fire casing, an air casing in communication therewith, a head plate dividing said air casing into an upper and a lower chamber, air cells depending from said head plate within the lower chamber, said cells being closed at their lower ends and in communication with the upper chamber, an air supply pipe leading into the upper chamber of the air casing and having a series of depending feed sections arranged respectively in the air cells and opening adjacent the lower closed ends of the latter, said air supply pipe and feed sections being in part arranged within the upper chamber to be initially heated therein.

4. A furnace including a fire casing, an air casing in communication therewith, a head plate dividing said air casing into an upper and a lower chamber, air cells depending from said head plate within the lower chamber, said cells being closed at their lower ends and in communication with the upper chamber, an air supply pipe leading into the upper chamber of the air casing and having a series of depending feed sections arranged respectively in the air cells and opening adjacent the lower closed ends of the latter, said air supply pipe and feed sections being in part arranged within the upper chamber to be initially heated therein, and a pressure means arranged within said air pipe.

5. A furnace including a fire casing, an air casing in communication therewith, a head plate dividing said air casing into an upper and a lower chamber, air cells depending from said head plate within the lower chamber, said cells being closed at their lower ends and in communication with the upper chamber, an air supply pipe leading into the upper chamber of the upper casing and having a series of depending feed sections arranged respectively in the air cells and opening adjacent the lower closed ends of the latter, said air supply pipe and feed sections being in part arranged within the upper chamber to be initially heated therein, a pressure means arranged within said air pipe, and a filter arranged at the inlet end of said pipe.

In testimony whereof I affix my signature in presence of two witnesses.

JOHN CAYGILL.

Witnesses:
ROBERT CALVERT,
ROBERT HENRY COOFER.